(12) United States Patent
Bertrand et al.

(10) Patent No.: US 10,288,176 B2
(45) Date of Patent: May 14, 2019

(54) VALVE COMPONENTS AND METHOD OF ASSEMBLY THEREFOR

(71) Applicant: FLUID AUTOMATION SYSTEMS S.A., Versoix (CH)

(72) Inventors: Christophe Bertrand, Nyon (CH); Didier Richardet, Crassier (CH)

(73) Assignee: Fluid Automation Systems SA, Versoix (CH)

( * ) Notice: Subject to any disclaimer, the term of this patent is extended or adjusted under 35 U.S.C. 154(b) by 28 days.

(21) Appl. No.: 15/609,392

(22) Filed: May 31, 2017

(65) Prior Publication Data

US 2017/0350512 A1 Dec. 7, 2017

(30) Foreign Application Priority Data

Jun. 3, 2016 (EP) .................................... 16172990

(51) Int. Cl.
| | | |
|---|---|---|
| *F16K 1/36* | (2006.01) | |
| *F16K 1/12* | (2006.01) | |
| *F16K 1/48* | (2006.01) | |
| *F16K 31/06* | (2006.01) | |

(52) U.S. Cl.
CPC .................. *F16K 1/36* (2013.01); *F16K 1/12* (2013.01); *F16K 1/48* (2013.01); *F16K 1/485* (2013.01); *F16K 31/0655* (2013.01)

(58) Field of Classification Search
CPC . F16K 1/32; F16K 1/485; F16K 1/482; F16K 1/487; F16K 1/36; F16K 1/48
See application file for complete search history.

(56) References Cited

U.S. PATENT DOCUMENTS

| | | | |
|---|---|---|---|
| 3,529,805 A | 9/1970 | Callahan, Jr. et al. | |
| 6,065,495 A | 5/2000 | Fong et al. | |
| 2006/0255308 A1* | 11/2006 | Weissinger | F16K 1/485 251/356 |

FOREIGN PATENT DOCUMENTS

WO 9966235 A2 12/1999

\* cited by examiner

*Primary Examiner* — Kevin Lee
(74) *Attorney, Agent, or Firm* — The Ollila Law Group LLC

(57) ABSTRACT

The invention provides a method of, and means for, connecting components of a moveable sub-assembly in a fluid control valve. To control a dimensional characteristic of the moveable sub-assembly, a first component of the sub-assembly can be crimped to create a mechanical connection to a second component of the moveable sub-assembly. The sub-components may be configured such that in the absence of the crimp they can be moveably translated between a plurality of positions and they may be slideably translatable between a number of relative positions, while the crimp acts, once formed, to retain the sub-components in a chosen position relative to one another.

13 Claims, 6 Drawing Sheets

VALVE COMPONENTS AND METHOD OF ASSEMBLY THEREFOR

FIELD OF THE INVENTION

The present invention relates to actuation means for use in fluid control valves. In particular, the invention relates to assemblies and methods for fine adjustment and fixing of component sub-assemblies during manufacture of the valve.

BACKGROUND

There can be a need in fluid control valves to fine-tune the dimensions of components of the valve, or of sub-assemblies of components of the valve. This can be due to potential variations in the dimensions of various sub-component parts, which may be the result of natural variance or inaccuracies in the manufacturing processes of components of the valve or its sub-assemblies. It is therefore important to be able to fine-tune dimensions of an assembly during the assembly process, to ensure that the correct sub-assembly dimensions, tolerances and/or clearances are achieved in the final valve assembly.

One way to adjust the dimension of a component is to use a threaded connection to achieve variations in longitudinal dimensions of a sub-assembly, by rotation of the components of the sub-assembly relative to one another, and to optionally use a glue to lock the two sub-components at a chosen relative position.

However, there are various problems with using a threaded connection and/or glue. Using a threaded connection has associated production costs and introduces mechanical gaps into the sub-assembly. These mechanical gaps may be detrimental to the valve performance, for example if the sub-component parts are a shaft and a plunger of a solenoid valve, using a threaded connection to connect the shaft and the plunger may reduce the magnetic performance of the solenoid valve.

Various problems can occur when using a glue to connect sub-component parts. One problem can be that the glue may limit the potential uses of the valve, as the glue may not be suited to coming into contact with an incompatible liquid, for example a corrosive liquid or any liquid that may react with or dissolve the glue or cause any chemical from the glue to leach into the liquid. Another problem with using a glue to secure two sub-component parts can be that the glue takes time to set, which may increase the production time for the valve and causes associated costs. Another problem with using a glue to secure two sub-component parts is that the glue's quantity may not be easily controlled. Another problem with using a glue to secure sub-component parts can be that the method of using a glue to attach the two sub-components may be susceptible to errors both in the accuracy of the dimension of the component, and the accuracy of the adhesive property of the glue. For example, the chemical composition and setting time of the glue may need to be controlled in order to give the required adhesive property. The setting reaction of the glue may be susceptible small errors caused by variations in temperature, atmospheric conditions and manufacturing contaminations. Small errors in the glue setting reaction may affect the setting time, which in turn can reduce the ability to accurately control the final dimension of the component since movement could occur during setting of the glue.

There is therefore a need for improved means to for attaching valve sub-components to one another.

STATEMENTS OF INVENTION

The invention provides a method of; and means for, connecting components of a moveable sub-assembly in a fluid control valve. To control a dimensional characteristic of the moveable sub-assembly, a first component of the sub-assembly can be crimped to create a mechanical connection to a second component of the moveable sub-assembly. The sub-components may be configured such that in the absence of the crimp they can be moveably translated between a plurality of positions and they may be slideably translatable between a number of relative positions, while the crimp acts, once formed, to retain the sub-components in a chosen position relative to one another.

A crimp is a plastic deformation of a first component, which causes it to fit with a second component to retain the components in a fixed relative position and/or orientation. One of the first and second components therefore grips the other once the crimp has been formed. The components are generally fixed to one another by a mechanical connection once the crimp has been formed. The crimp may restrict movement in any direction or orientation between the components or may restrict longitudinal or lateral movement while allowing movement in a second direction, or while allowing relative rotation of the components relative to one another.

According to a first aspect of the invention, there is provided a valve. The valve comprises: a first fluid port; a second fluid port; an orifice providing a fluid connection between the first and second fluid ports; and a moveable sub-assembly. The moveable sub-assembly is moveable between a first position in which the fluid connection is open and a second position in which the fluid connection is closed by the moveable sub-assembly. The moveable sub-assembly comprises first and second sub-components. The first and second sub-components are mechanically connected by a crimp to fix a position of the first sub-component relative to the second sub-component.

The valve may comprise a valve seat disposed about the orifice. The valve seat may be configured to engage the moveable sub-assembly in the second position. The moveable sub-assembly may comprise a sealing portion configured to seal the valve seat to close the fluid connection between the first and second ports. The sealing portion may comprise a flexible diaphragm. The sealing portion may comprise a rigid diaphragm.

The valve may comprise a biasing means configured to bias the valve toward an open or closed position. The valve may comprise a biasing means configured to bias the valve toward a substantially open or a substantially closed position.

The first sub-component may be at least partially received inside the second sub-component and the crimp may be a mechanical deformation of the first sub-component. The first sub-component may be a shaft received at least partially within the second sub-component.

The second sub-component may comprise one or more openings configured to enable access to a crimping region to form the crimp. The second sub-component may comprise two openings, the two openings being arranged on substantially opposite sides of the second sub-component. The second sub-component may have a first end oriented away from the orifice, and a second end oriented towards the orifice, and the openings may be located towards the first end.

The second sub-component may be configured to receive an actuating force of an actuator of a valve. The second sub-component may be connected to an actuator of the valve. The second sub-component may be a plunger of a solenoid for actuating the valve. The actuator may comprise a shape memory alloy (SMA) element.

The actuator may be a thermal actuator, a magnetic actuator, a manual actuator, a hydraulic actuator, a piezo-electric actuator, a pneumatic actuator, or an electric actuator. The actuator may be isolated from the flow of fluid through the valve.

The actuator may be arranged substantially to one side of the orifice, and fluid flow towards and away from the orifice may be substantially to and from the second side of the plane of the orifice. The first fluid port and the second fluid port may extend in substantially the same direction. Fluid flow may pass through the orifice in a first direction and turn through at least a right angle to flow away from the orifice.

The second fluid port may be in fluid communication with a plurality of valve orifices. Each valve orifice may be configured to be opened or closed by a respective moveable member. Each moveable member may comprise first and second sub-components, the respective first and second sub-components being mechanically connected by a crimp to fix a position of each first sub-component relative to each respective second sub-component. The valve may comprise a plurality of first parts in fluid communication with the plurality of valve orifices.

According to a second aspect of the invention, there is provided a method of forming a moveable valve sub-assembly for a fluid control valve comprising the steps of: providing first and second sub-components for a moveable subassembly of a fluid control valve; adjusting a position of the first and second sub-components relative to one another; and forming a crimp on one of the first and second sub-components to fix their relative positions in at least a first direction.

The method of forming a moveable valve sub-assembly for a fluid control valve may comprise the step of; measuring the relative positions of the first and second sub-components in at least a first direction prior to forming the crimp.

The method may comprise the step of; crimping one of the first and second sub-components using a mechanical crimping tool to fix the relative positions of the first and second sub-components in at least a first direction.

The method may comprise the steps of: inserting the first sub-component at least partially into the second sub-component; and forming the crimp on the first sub-component within the second sub-component.

The crimp may be formed directly on the first sub-component by the crimping tool.

The second sub-component may comprise one or more openings, and the method may comprise inserting at least one crimping tool into the one or more openings. The two openings may be arranged on substantially opposite sides of the second sub-component.

The first sub-component may be a shaft of a valve. The second sub-component may be a plunger of a solenoid or other actuating means for actuating a valve.

The method described in the second aspect of the invention may be applied to the valve described in the first aspect of the invention.

DETAILED DESCRIPTION OF PREFERRED EMBODIMENTS

Figure 1:
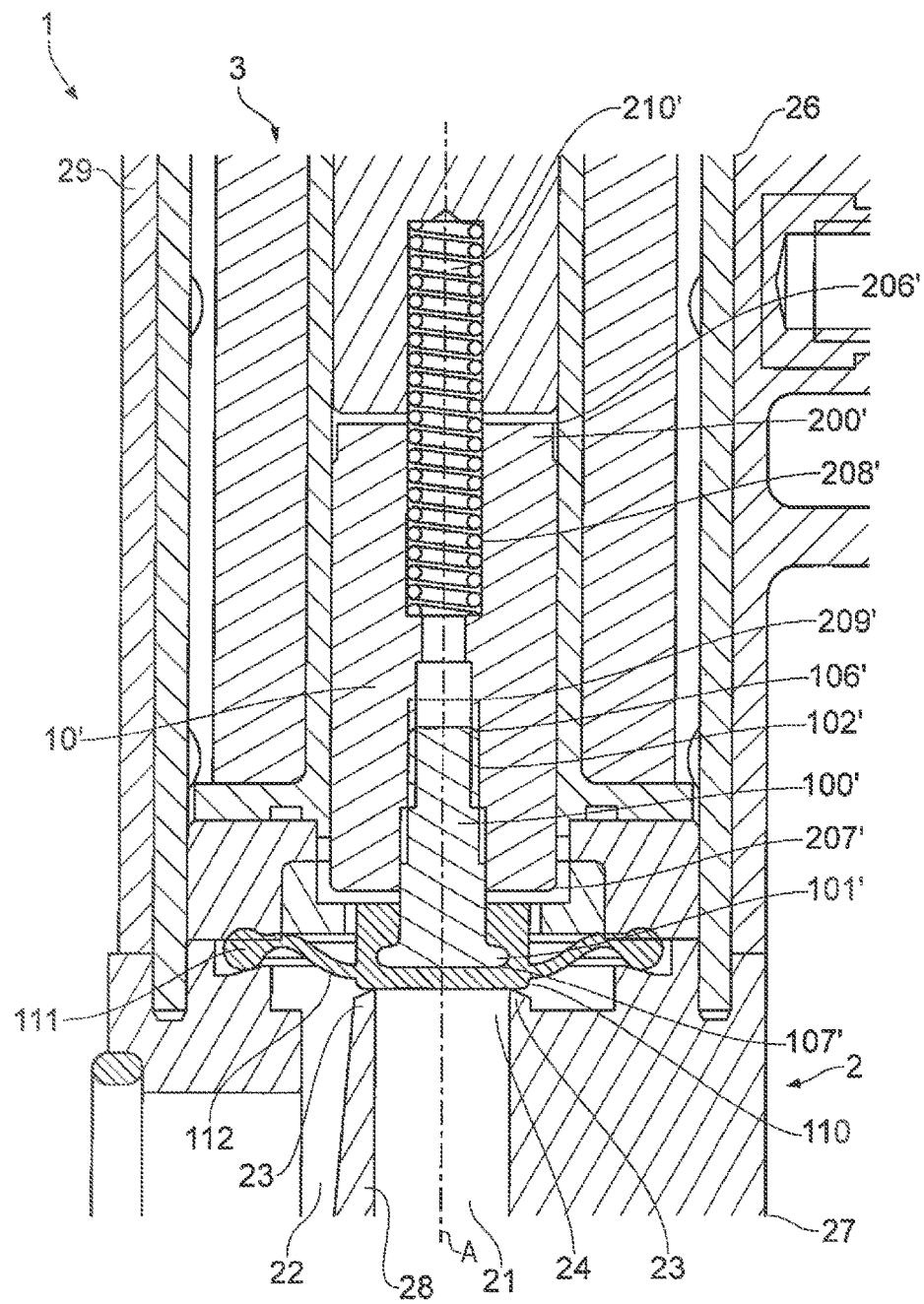
FIG. 1 shows a prior art valve assembly.

The prior art valve 1 shown by the schematic illustration in FIG. 1 has a valve body 2, a moveable sub-assembly 10', an actuating means 3 and a cover 29. The moveable sub-assembly 10' extends inside the valve 1 along an axis A.

The moveable sub-assembly 10' of the valve 1 has a shaft 100', a seal 110' formed on the shaft 100' and a magnetic plunger 200'. The shaft 100' extends at least partially inside the plunger 200' along the axis A and the shaft 100' extends at least partially outside the plunger 200' along the axis A.

The shaft 100' is substantially cylindrical and has a first end 106' and a second end 107'. The shaft 100' terminates in a head 101' at the shaft second end 107'. The head 101' extends radially outwardly of the shaft such that in cross-section the head 101' is symmetrical about the axis A. The shaft 100' has a screw thread 102' proximate the shaft first end 106'.

The plunger 200' is substantially cylindrical and has a first end 206' and a second end 207'. The plunger 200' has a first blind bore 208' proximate the plunger first end 206'. The plunger 200' has a biasing means 210'. The biasing means 210' extends along the first blind bore 208'. The biasing means extends at least partially inside the plunger 200' and at least partially outside the plunger 200' along an axis A. The biasing means 210' is a spring. The plunger 200' has a second blind bore 209' proximate the plunger second end 207'. The second blind bore 209' is threaded. The thread of the second blind bore 209' is adapted to engage with the screw thread 102' of the shaft 100'.

The shaft 100' is attached to the plunger 200' by the screw thread 102' of the shaft and the threaded second blind bore 209' of the plunger. The shaft 100' and the plunger 200' are fixed in place by a glue (not shown).

The seal 110' is attached to the shaft 100' at the second end 107' of the shaft. The seal 110' has a flexible diaphragm 112. The flexible diaphragm 112 extends radially from the shaft and terminates in a rim 111. The diaphragm 112 acts to isolate the fluid path through the valve from the actuating means 3, and the moveable sub-assembly 10'.

The moveable sub-assembly 10' extends inside the actuating means 3 along an axis A. The actuating means 3 is a solenoid.

The cover 29 surrounds and/or encloses substantially all of the moveable sub-assembly 10. The cover 29 surrounds and/or encloses substantially all of the actuating means 3.

The valve body 2 has a first fluid port 21, a second fluid port 22 and a valve seat 23. The valve body 2 has a body first end 26 and a body second end 27. The first fluid port 21 and the second fluid port 22 extend from the body second end 27 towards the body first end 26. The first fluid port 21 is aligned along the axis A. The second fluid port 22 is radially offset relative to the first fluid port 21. The second fluid port 22 is separated from the first fluid port by a separating wall 28. The valve seat 23 surrounds an orifice 24 providing a fluid connection between the first port 21 and the second port 22. The valve seat 23 is configured to engage the seal 110.

The moveable sub-assembly 10' is attached to the valve body 2 by the biasing means 210. The moveable sub-assembly is also attached to the valve body 2 at the rim 111 of the seal 110.

The moveable sub-assembly 10' is adapted to move axially between two positions, a fully closed position and a fully open position. In the fully open position, the first fluid port 21 and the second fluid port 22 are in fluid communication. In the fully closed position, the first fluid port 21 and the second fluid port 22 are not in fluid communication. In the fully open position, the shaft 100' and the plunger 200' are moved away from the valve body 2, while in the fully closed position the shaft 100' and the plunger 200' are moved toward the valve body 2 to close the orifice 24.

Figure 2:
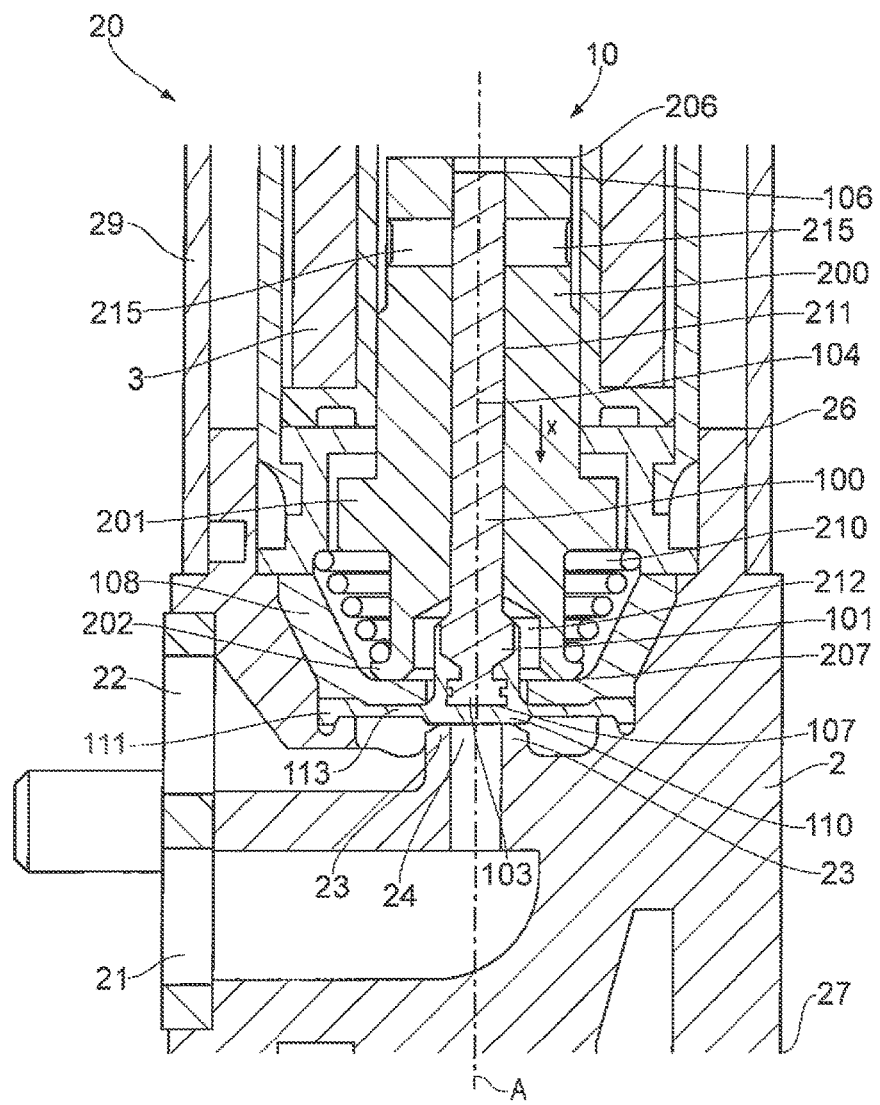
FIG. 2 shows an embodiment of a valve according to the present invention.

FIG. 2 shows a valve according to a first embodiment of the present invention. The valve 20 shown by the schematic illustration in FIG. 2 has a body 2, a moveable sub-assembly 10, an actuating means 3 and a cover 29. The moveable sub-assembly 10 extends inside the valve 1 along an axis A.

The valve body 2 is configured to define at least part of a fluid pathway through the valve 20. The valve body 2 may be attachable to an apparatus that defines a continuation of the fluid pathway, the continuation of the fluid pathway being in fluid communication with the fluid pathway through the valve 20.

The valve sub-assembly 10 is adapted to move relative to the valve body 2. The valve sub-assembly can be adapted to move relative to the valve cover 29. The valve sub-assembly can be adapted to move relative to the actuating means 3.

The valve sub-assembly 10 is adapted to create at least a partial variation in flow restriction through the fluid pathway upon actuation by the actuating means 3. The valve sub-assembly 10 may be adapted to completely close the fluid pathway upon actuation by the actuating means 3. The valve sub-assembly 10 may be adapted to open the fluid pathway upon actuation of the actuating means 3.

The actuating means 3 is configured to apply an actuating force to the sub-assembly 10. In particular, the actuating means 3 may apply an actuating force to the plunger 200. The actuating force can move the sub-assembly 10 in a direction X. The direction X may be towards the valve body 2 as shown in FIG. 2. The actuating force may be in the opposite direction, such that the actuator 3 applies an actuating force to move the sub-assembly 10 in an opposite direction to direction X. The opposite direction can therefore be away from the valve body 2. Suitable actuating means can be arranged to create an actuating force both in the direction of arrow X and/or in the opposite direction, to open and close the valve.

The sub-assembly 10 may be subject to a biasing force, by way of a biasing means 210. The biasing force may, for example, be provided by means of the illustrated spring 210 attached to the sub-assembly 10. The biasing means 210 can be adapted to move the sub-assembly 10 in a direction X upon removal of an actuating force. The biasing means 210 may be adapted to move the sub-assembly 10 in an opposite direction to the direction X upon removal of an actuating force.

The cover 29 can be provided to protect the components of the valve 20. The cover 29 may be adapted to connect and/or contain components of the valve 20.

It will be apparent that some features of the valve of the invention are common to both the prior art valve of FIG. 1 and the valves of the embodiments of the invention described in the following. Similar features are therefore labelled with common reference numerals. The principal differences lie in the methods and means used to connect parts of the moveable sub-assembly 10 to one another and embodiments are described in more detail in the following.

The moveable sub-assembly 10 of a valve 1 according to embodiments of the invention has a shaft 100, a seal 110 formed on the shaft 100, and a plunger 200. A limiter 108 may also be included as described in further detail below.

The plunger 200 is configured to be actuated by the actuating means 3. The plunger 200 may comprise a material susceptible to magnetisation and the actuating means 3 may comprise a solenoid coil. As will be shown in later embodiments, other forms of actuating means for the plunger can be envisaged. The illustrated plunger 200 has a longitudinal length L, in the direction of actuation of the plunger.

The shaft 100 is configured to connect the plunger 200 to the seal 110. The shaft 100 and the plunger 200 may be adjusted before crimping and their positions relative to each other may be measured and controlled before the crimping takes place. The shaft 100 is configured to fix the position of the plunger 200 relative to the position of the seal 110. The shaft 100 is adapted to be fixed to the plunger 200 upon crimping of the shaft 100. The shaft 100 may be adapted to be fixed to the plunger 200 such that no relative movement is permitted in a first direction. The first direction is preferably the direction of actuation of the plunger, or of its longitudinal axis A. The shaft 100 may be adapted to be fixed to the plunger 200 such that no relative movement is permitted in a second direction different to the first. The shaft 100 may be adapted to be fixed to the plunger 200 such that no relative movement is permitted in a third direction different to the first and second directions. The first, second and third directions may be substantially orthogonal. The first direction may be aligned with the direction X. The second direction may be a rotation, which may be about the axis A. The shaft and plunger may be adapted to be fixed to each other so that no relative movement in any direction is permitted. However, as described in the above, some degree of movement in one or more directions may be permitted after the crimp in certain examples.

The seal 110 may have a substantially planar shape as illustrated in FIG. 2. The seal 110 may be arranged substantially perpendicularly to the longitudinal axis of plunger 200. The seal may be arranged substantially perpendicularly to the shaft 100. The seal 110 can be adapted to be movable within the valve 20, such that the seal 110 may be moveable towards the valve body 2 and/or the orifice 24. The seal 110 may be retained in the valve such that it can only move in two directions, substantially parallel to the axis A. The seal 110 may be restricted so that it can only move in two directions, in the direction X and in the opposite direction to the direction x. The seal 110 can be adapted to contact the valve body 2 upon movement of the sub-assembly 10 in the direction x.

The limiter 108 may optionally be provided and can act to restrict the movement of the sub-assembly 10 relative to the valve body 2. The limiter 108 may restrict movement of the valve sub-assembly 10 such that the valve sub-assembly 10 has at least one limit to translational movement controlled by the limiter 108. The limiter 108 can place an upper limit on the distance that the sub-assembly 10 can move away from the valve body 2 if so desired. This can prevent the flexible diaphragm 112 from being over-extended.

In the example shown, the shaft 100 extends at least partially inside the plunger 200 along the axis A and the shaft 100 extends at least partially outside the plunger 200 along the axis A.

In a preferred embodiment, the shaft 100 is substantially cylindrical and has a first end 106 and a second end 107. The shaft 100 can, in the illustrated example, have a stem 104. The stem 104 can terminate in a head 101 at the shaft second end 107. The bead 101 may extend radially outwardly of the shaft stem 104 and in cross-section the head 101 may be symmetrical about the axis A. The shaft may also have a shaft bulb 103. The shaft bulb 103 may be attached to the shaft head 101 by a neck. The shaft may have a smaller diameter than the diameter of the head 101. The optional shaft bulb 103 has a diameter that is larger than the diameter of the neck. The shaft bulb 103 may have a radial groove. The shaft bulb 103 is preferably symmetrical about the axis A. The radial groove of the shaft bulb 103 is symmetrical about the axis A. Axis A is preferably parallel to and may be coaxial with a longitudinal axis of the shaft 100.

The seal 110 is attached to the shaft 100 at the second end 107 of the shaft. The seal 110 is attachable to any or all of the shaft head 101, shaft neck and shaft bulb 103. The seal 110 preferably has a base 113. The base 113 extends radially from the shaft and preferably terminates in a rim 111.

The illustrated example of a limiter 108 has a limiter base and a flange. The limiter base may be disposed between the base 113 of the seal 110 and the plunger 200. The flange of the limiter 108 may extend both radially and axially from the limiter base. The flange may be frusto-conical. The flange may extend further radially than the plunger 200, thus having a greatest radial dimension larger than that of the plunger 200.

The plunger 200 may be substantially cylindrical. The plunger 200 has a first end 206 and a second end 207. The plunger 200 may have a plunger ledge 201, taking the form of a substantially radial projection about at least a part of its outer surface. The plunger 200 may have a plunger rim 202. The plunger 200 may have a bore 211 for receiving the shaft. The bore 211 may extend from the plunger first end 206 to the plunger second end 207, or only partially trough the plunger. The bore 211 may terminate in a cavity 212 at the plunger second end 207, having a larger diameter than the bore 211. The plunger ledge 201 may extend radially from the plunger 200. The plunger ledge 201 may be located between the plunger first end 206 and the plunger second end 207. The plunger rim 202 can extend radially from the plunger 200. The rim can act to provide a reaction surface for the biasing means for the plunger. The plunger rim 202 may be located at the plunger second end 207. The axial dimension of the plunger ledge 201 may be larger than the axial dimension of the plunger rim 202.

The plunger 200 may have a biasing means 210. The biasing means 210 may be located at least in part along the plunger 200 between the plunger ledge 201 and the plunger rim 202. The biasing means 210 may be a spring or other resilient means such as an elastic member.

The plunger 200 may have one or more openings 215. The opening(s) 215 extend from the plunger bore 211 to the outer edge of the plunger 200. The openings 215 are located between the plunger first end 206 and the plunger second end 207. The openings 215 may be located towards the plunger first end 206, such that a length defined between the openings 215 and the first end 206 is smaller than a length defined between the openings and the second end 207. The openings 215 may be substantially cylindrical. The openings 215 may be on substantially opposite sides of the plunger 200. The openings 215 may be oriented such that they collectively have rotational symmetry about the axis A of 180°. The openings 215 may be substantially perpendicular to the bore 211. The openings 215 are adapted to receive a crimping tool and can allow the crimp to be applied to the shaft 104 internally to the plunger 200.

A person skilled in the art will recognise that there are many workable variations of the plunger opening form and location. Their primary function is to allow a crimp to be applied to the shaft inside the plunger 200. The openings 215 may be located at the plunger second end 207. The openings 215 may be located at any point along the plunger 200. The openings 215 may define any arbitrary shape that allows a crimping tool to pass through the openings 215.

The shaft 100 may extend inside the plunger. The bore 211 of the plunger 200 may be adapted to receive the stem 104 of the shaft 100. The shaft 100 may be adapted such that the shaft stem 104 can extend within the plunger 200, such that the shaft stem 104 extends past the openings 215 along the axis A. The dimension defined between the openings 215 and the cavity 212 of the plunger 200 may be less than the axial dimension of the shaft stem 104. The head 101 of the shaft 100 may have a diameter that is larger than the diameter of the bore 211. The head 101 of the shaft may alternatively have a diameter that is smaller than the diameter of the cavity 212 of the plunger 200.

The shaft 100 is fixedly attachable to the plunger 200 by crimping. Upon crimping the shaft 100 by inserting a crimping tool into the openings 215, the shaft 100 may locally deform radially outwards. Upon crimping, the shaft 100 may be fixedly attached to the plunger 200 in a region around the openings 215 of the plunger 200. Upon attachment of the shaft 100 and plunger 200 by crimping, the shaft 100 and plunger 200 are held in a fixed position in at least one direction.

Many workable variations in shape of the shaft 100 are possible. Many variations in the orientation and position of the shaft 100 relative to the plunger 200 are possible. Crimping of the shaft 100 is possible if the shaft 100 extends at least partially past at least one of the openings 215 of the plunger 200.

The moveable sub-assembly 10 may extend inside the actuating means 3 along an axis A. The cover 29 may surround and/or enclose substantially all of the moveable sub-assembly 10. The cover 29 may surround and/or enclose substantially all of the actuating means 3.

As shown in the illustrated embodiment, the valve body 2 has a first fluid port 21, a second fluid port 22 and an orifice 24 between the first and second fluid ports, the orifice preferably further having a valve seat 23. The valve body 2 has a body first end 26 and a body second end 27. The second fluid port 22 may extend substantially radially from the axis A.

The first fluid port 21 may extend both axially along the axis A and radially from the axis A. The second fluid port 22 may be separated from the first fluid port 21 by a separating wall. The separating wall may extend radially. The valve seat 23 may surround the orifice 24, which provides a fluid connection between the first fluid port 21 and the second fluid port 22. The valve seat 23 may be configured to engage the seal 110.

The moveable sub-assembly 10 may be attached to the valve body 2 by the biasing means 210.

The moveable sub-assembly 10 is adapted to move axially between two positions, a closed position and a open position. The two positions may be a substantially closed position and a substantially open position. In the open position, the first fluid port 21 and the second fluid port 22 are in fluid communication. In the closed position, the first fluid port 21 and the second fluid port 22 are not in fluid communication. In the open position, the shaft 100 and the plunger 200 may be moved away from the valve body 2, while in the fully closed position the shaft 100 and the plunger 200 may be moved towards the valve body 2 to close the orifice 24. It will be appreciated that a range of intermediate positions between the open and closed positions can be envisaged, and a range of intermediate flow restrictions between the first and second ports will be provided by the valve over this range of positions.

Figure 3:
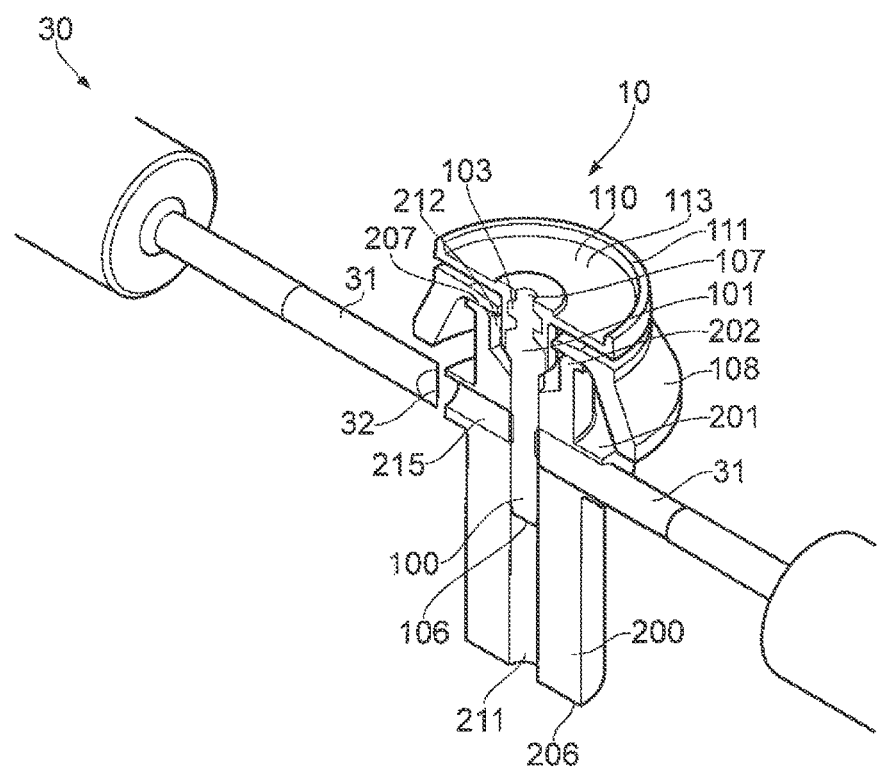
FIG. 3 shows the valve sub-assembly of the valve of FIG. 1 being crimped by a crimping tool.

FIG. 3 shows a section through the valve sub-assembly 10 according to the present invention during the crimping process. The valve sub-assembly 10 of FIG. 3 has the openings 215 of the plunger located inside the plunger ledge 201. As shown by FIG. 2, the openings 215 of the plunger 200 may be located at any point along the plunger 200.

The crimping tool 30 may comprise one or more, preferably two, crimping toll members 31. The crimping tool members 31 may be substantially cylindrical. The crimping tool members may each have a crimping apex 32. The crimping tool members 31 may each be tapered to a line which defines an apex 32 of the respective crimping tool members 31. Each opening 215 of the plunger 200 may be adapted so that a crimping tool members 31 can be inserted into the or each opening 215.

Although in FIG. 3 the crimping tool apex 32 is tapered to a line, it will be appreciated that the crimping tool apex 32 may be any shape. For example, the crimping tool apex may be a point, a line, a circle, a polygon or any arbitrary shape.

FIG. 3 shows one crimping tool member 31 inside one of the openings 215 of the plunger 200, and one crimping tool member 31 aligned with the other opening 215 of the plunger 200.

As can be appreciated from FIG. 3, the crimping tool member or members can be used to apply a crimp to one or both sides of the shaft 100 and the resulting deformation causes a portion of the shaft to engage a portion of the plunger 200 and to lock them in fixed relative positions.

Figure 4:
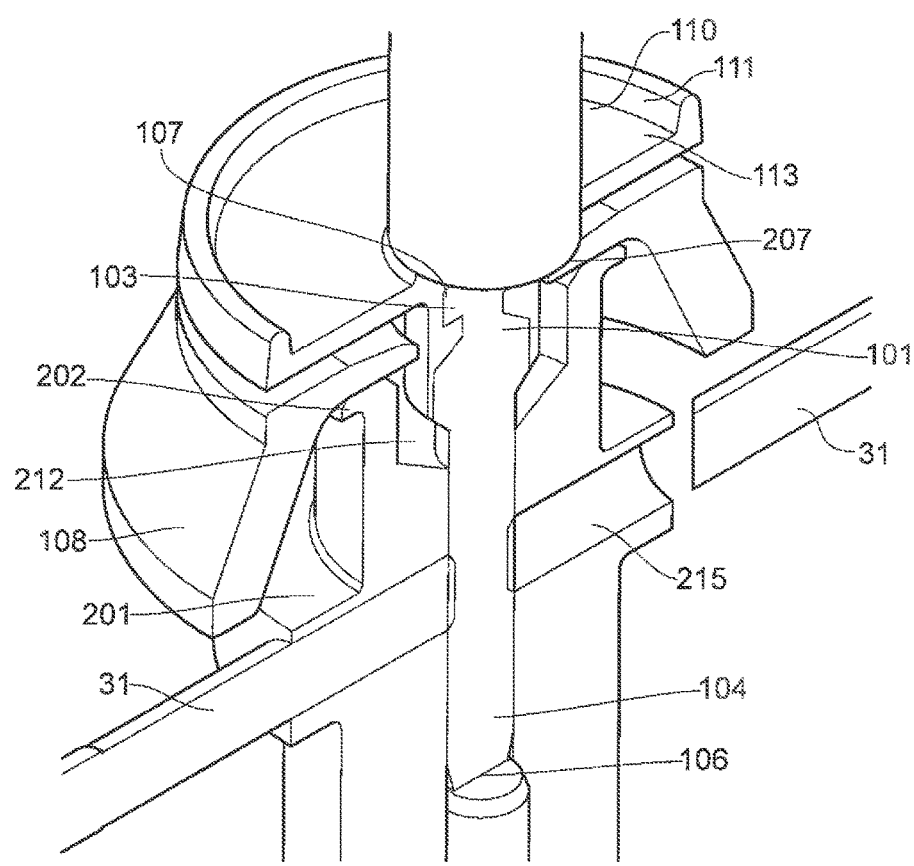
FIG. 4 shows an enlarged view of the valve sub-assembly of FIG. 3 being crimped by a crimping tool.

FIG. 4 shows an enlarged view of the valve sub-assembly section of FIG. 3. The crimped region of the shaft 100 in FIG. 4 is highlighted.

Figure 5:
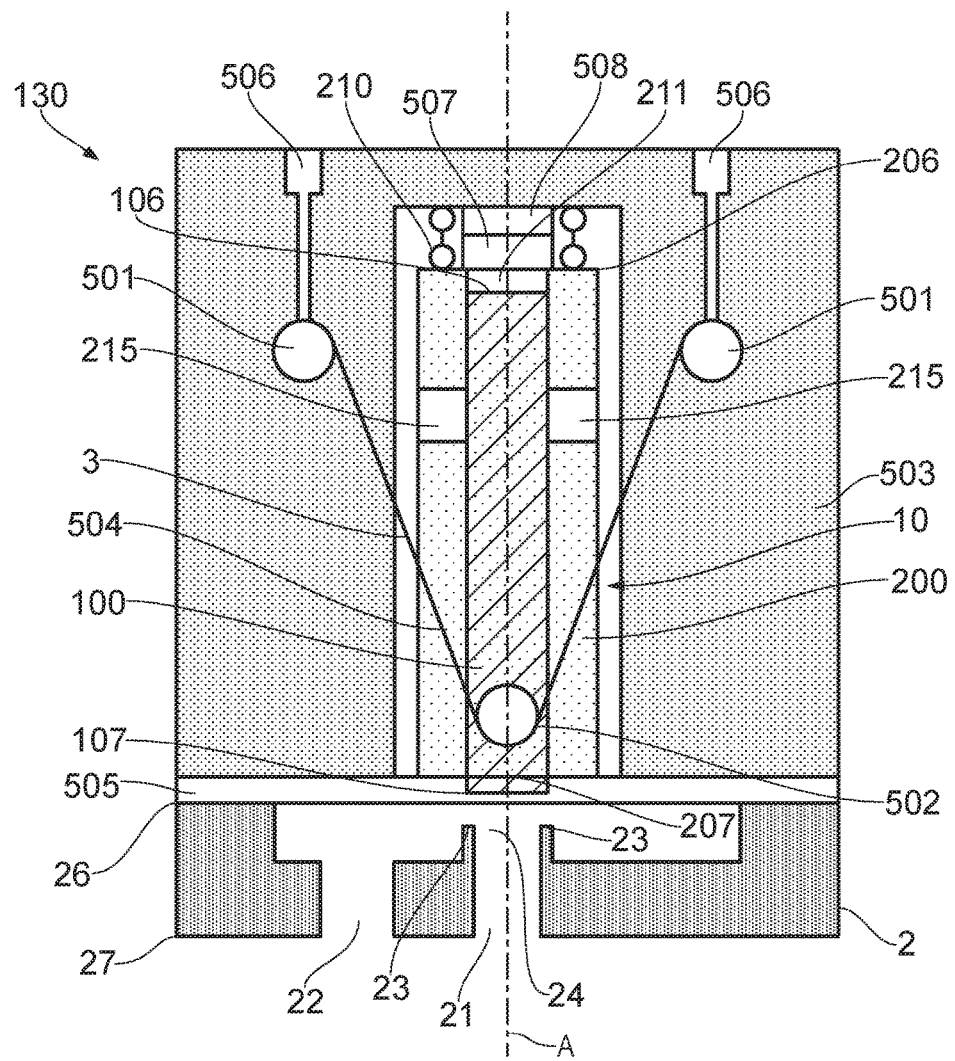
FIG. 5 shows a further embodiment of a valve comprising a sub-assembly according to the present invention.

FIG. 5 shows a valve assembly 130 according to a second embodiment of the present invention. Where reference numerals used in FIG. 5 are the same as reference numerals used in FIGS. 2 to 4 and 6, the duplicated reference numeral refers to either the same component or a similar alternative component. FIG. 5 illustrates how the crimping method of the invention may be utilised in conjunction with alternative valve actuating means. In this case a shape memory alloy actuating element is shown, but other actuating means can be envisaged. The primary function of the crimp is to set a distance between the sealing end of the moveable sub-assembly and the actuating means.

As in the previous embodiments, the valve assembly 130 may have a valve body 2, a moveable sub-assembly 10, an actuating means 3 and may further include a support structure 503. The moveable sub-assembly 10 may extend inside the valve 1 along an axis A.

The moveable sub-assembly 10 of the valve 130 may have a shaft 100, a membrane 505 formed on the shaft 100 and a plunger 200. The shaft 100 may extend at least partially outside the plunger along the axis A.

The shaft 100 may be substantially cylindrical. The shaft 100 has a first end 106 and a second end 107. The shaft 100 may have a homogenous cross-section along the length of the shaft 100. The shaft 100 may be the same shape as the shaft 100 shown in any of FIGS. 1 to 4 and 6.

The membrane 505 may be attached to the shaft 100 at the second end 107 of the shaft. The membrane 505 may extend radially from the shaft 100 between the valve body 2 and the valve support structure 503.

The plunger 200 may be substantially cylindrical. The plunger 200 may have a first cod 206 and a second end 207. The plunger 200 may have a homogenous cross-section along the length of the plunger 200. The plunger 200 may be substantially the same shape or form as the plunger 200 shown in any of FIGS. 1 to 4 and 6 and may include any or all of the feature of the plunger 200 of the earlier figures.

The plunger 200 may have a bore 211. The bore may extend from the plunger first end 206 to the plunger second end 207. The plunger 200 may have a biasing means 210. The biasing means 210 may be located at the plunger first end 206.

The plunger 200 may have two openings 215. The openings 215 may extend radially from the plunger bore 211 to the outer edge of the plunger 200. The openings 215 may be located between the plunger first end 206 and the plunger second end 207. The openings 215 may be located towards the first end, such that a length defined between the openings 215 and the first end 206 is smaller than a length defined between the openings and the second end 207. The openings 215 may be substantially cylindrical. The openings 215 may be on substantially opposite sides of the plunger 200. The openings 215 may be oriented such that they collectively have rotational symmetry about the axis A of 180°. The openings 215 may be substantially perpendicular to the bore 211. The openings 215 may be adapted to receive a crimping tool.

The plunger 200 may have a mechanical connection 502. The mechanical connection 502 may be arranged towards the plunger second end 207.

The shaft 100 may extend inside the plunger 200. The bore 211 of the plunger 200 may be adapted to receive the shaft 100. The shaft 100 may be adapted such that the shaft 100 can extend within the plunger 200, such that the shaft 100 extends past the openings 215 along the axis A.

The shaft 100 is fixedly attachable to the plunger 200 by crimping. Upon crimping the shaft 100 by inserting a crimping tool into the openings 215, the shaft 100 may locally extend radially outwards. Upon crimping, the shaft 100 may be fixedly attached to the plunger 200 in a region around the openings 215 of the plunger 200. Upon attachment of the shaft 100 and plunger 200 by crimping, the shaft 100 and plunger 200 are fixed in at least one direction.

The valve body 2 may have a first fluid port 21, a second fluid port 22 and a valve seat 23. The valve body 2 may have a body first end 26 and a body second end 27.

The first fluid port 21 may extend from the body second end 27 towards the body first end 26. The second fluid port 22 may extend from the body second end 27 towards the body first end 26.

The first fluid port 21 may be aligned along the axis A. The second fluid port 22 may be disposed radially to the first fluid port 21. The second fluid port 22 may be separated from the fast fluid port by a separating wall. The separating wall may extend axially. The valve seat 23 may surround an orifice 24 providing a fluid connection between the first fluid port 21 and the second fluid port 22. The valve seat 23 may be configured to engage the membrane 505.

The moveable sub-assembly 10 may be attached to the support structure 503 by the biasing means 210. The support structure 503 may support the plunger 200 in a desired orientation for switching the valve between open and closed positions. The support structure 503 may be disposed about the plunger 200 such that the plunger 200 is substantially between opposite parts of the support structure 503. The support structure 503 may comprise engagement points 501. The engagement points 501 may be arranged toward the plunger first end 206.

The support structure 503 may be a Printed Circuit Board (PCB). The PCB 503 may be provided with electrical connection points 506 for providing electric current to the engagement points 501. The engagement points 501 may be configured for coupling a Shape Memory Alloy (SMA) element 504 to the support structure. Likewise, the mechanical connection 502 may be configured to engage the SMA element 504 which is coupled to the support structure 503.

The moveable sub-assembly 10 may be adapted to move axially between two positions, a fully closed position and a fully open position. The two positions may be a substantially closed position and a substantially open position. In the fully open position, the first fluid port 21 and the second fluid port 22 may be in fluid communication. In the fully closed position, the first fluid port 21 and the second fluid port 22 may not be in fluid communication. In the fully open position, the shaft 100 and the plunger 200 may be moved away from the valve body 2. In the fully closed position the shaft 100 and the plunger 200 may be moved towards the valve body 2 to close the orifice 24.

SMA element 504 may be coupled to an engagement point 501 toward a first side of the support structure 503 and to a further engagement point 501 toward a second side of the support structure. SMA element 504 may pass via a mechanical connection 502 on the plunger 200 on its route between those points.

SMA element 504 may be a wire element. In the illustrated arrangements, it is possible to have a relatively simple connection between the SMA element and the plunger by effectively 'looping' the SMA element around the connection pin 502 and connecting to connection points to either side of the support structure 503.

This is a straight forward way to provide a balanced force to drive the plunger 200 in a straight direction. By providing a fixed connection between a single connection point 501 and the plunger, a single SMA element 504 can be provided between the plunger 200 and the SMA element 504 to actuate the plunger 200 relative to the support structure 503.

Pressure provided by the plunger 200 to isolation membrane 505 may move the membrane 505 to close the fluid flow path and maintains a tight seal. It will be appreciated that SMA elements 504 may comprise a plate, or a film deposition etc. and would still perform the appropriate function.

The SMA element 504 is actuated to cause movement of the plunger 20. When first engagement points 501 are energized through the provision of an electrical current, the SMA element 504 is thermoelectrically heated. Shape memory alloys are metals that are generally known for their physical transformation at a transition temperature. By combining the appropriate alloys, the transition temperature of the SMA element 504 can be determined and tailored. The transition temperature is generally understood as the temperature at which an SMA material transforms from a first crystal structure e.g. martensite, to a second crystal structure e.g. austenite. When the exemplary SMA element 504 is below the transition temperature, the metal has a martensitic crystal structure. Whilst in the martensitic crystal orientation, the alloy can be plastically deformed into a first size and/or shape, and remain in the deformed shape while below the transition temperature. When the deformed shape is heated to above the transition temperature, the exemplary material transforms into the austenite crystal structure, where the alloy returns to its "memorized", pre-deformed, second size and/or shape. The transformation that occurs in SMA materials is relatively fast as no diffusion occurs. This unique property of SMA materials can be utilized in the valve 1 in order to selectively open or close the valve 1 as discussed below.

The thermoelectrical heating of the SMA element or elements 504 is achieved through applying a differential voltage and/or current between two or more electrical contacts. Actuation of an attached SMA element 504 can cause the plunger to either open or close the fluid path between the first fluid port 21 and the second fluid port 22.

It will be appreciated that although one mechanical connection 502 is shown on the plunger 200, the valve assembly 130 could operate having two mechanical connection points.

The valve 130 may comprise a magnet 507 at the first end 206 of the plunger 200. Magnet 507 may be a permanent magnet. A force/pressure sensor 508 may optionally be provided which can indicate, when the plunger is in the "open" position, the force or pressure of the fluid that is applied to the membrane 505. The sensor can be connected to control electronics of the valve assembly, preferably on the PCB 503.

Figure 6:
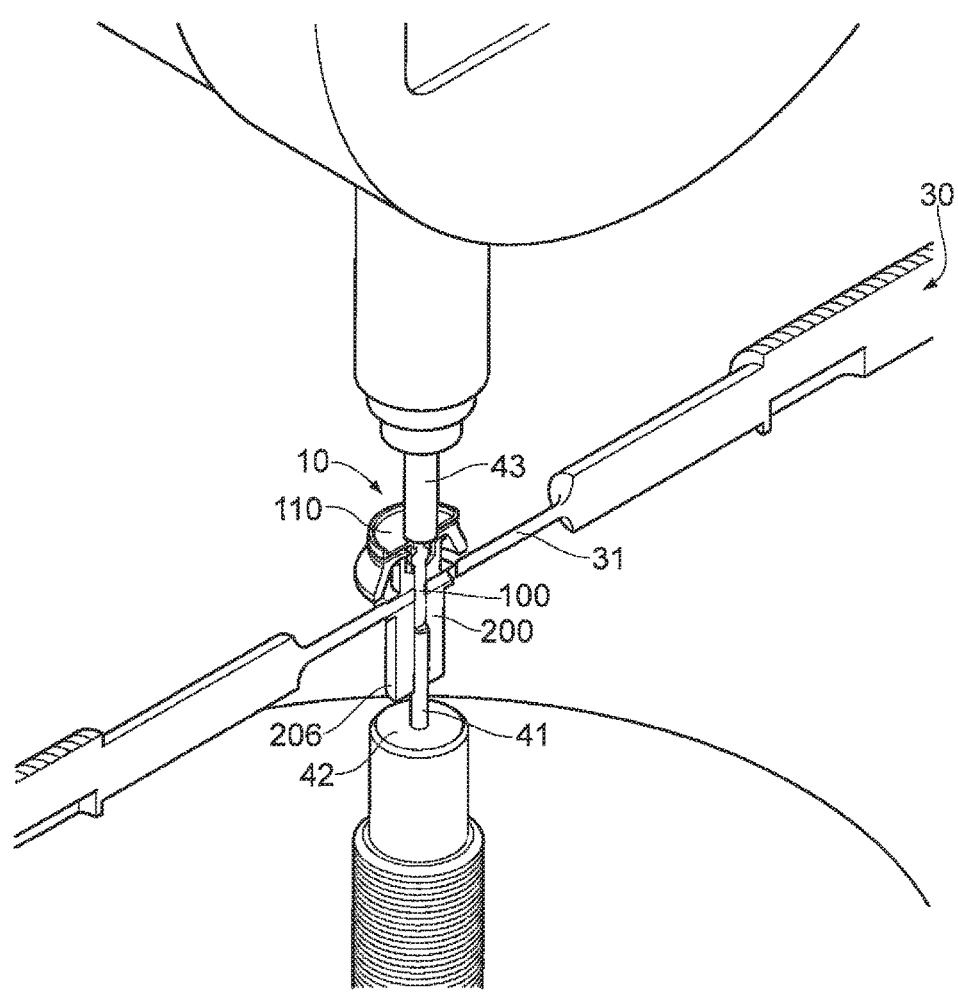
FIG. 6 shows an embodiment of a valve sub-assembly according to the present invention being aligned by an alignment tool and crimped by a crimping tool.

FIG. 6 shows the valve sub-assembly 10 of FIG. 3, a crimping tool 30 and a dimension-setting apparatus 40. The valve sub-assembly 10 and crimping tool 30 are as described previously.

The details of apparatus suitable for supporting and moving the valve components in the manner illustrated, and actuating the crimping members to form the crimp will be evident to one skilled in the manufacture of valve assemblies in light of the following teaching and so these are not described in detail in the following sections. The dimension-setting apparatus 40 may have a base platform 42, a base rod 41 and a measuring arm 43. Suitable supports and drive means can be provided by known means to support the base platform 42, base rod 41 and measuring apparatus 43 and to permit them to be automatically or manually moved relative to one another. The crimping members 30 can be supported and/or driven by suitable linear drive means such as hydraulic rams, rack and pinion arrangements, or any other form of substantially linear drive, to advance the crimping members into and out of the openings 215 in the plunger 200.

Suitable manually or automatically moveable supports can also be provided for the measuring means 43, base platform 42 and base rod 41, to support and move them relative to one another. It will be appreciated that the main direction of movement required for the method described is in the direction of the axis of the plunger 200 and shaft 100, to allow them to be moved relative to one another in a longitudinal direction, and for that longitudinal movement to be measured by the measurement means 43. The measurement means 43 can be any suitable linear displacement measuring device, such as a linear variable differential transformer, piezoelectric measurement device or any other suitable means as will be apparent to the reader skilled in valve assembly methods and apparatus in light of the present disclosure.

To perform the required crimping, the plunger 200 may be placed onto the base platform 42 and the shaft 100 is placed inside the plunger 200 so that the shaft 100 rests on the base rod 41. The shaft 100 is configured so as to be moveable relative to the plunger 200, in the axial direction of the shaft 100 and the plunger 200 until the above described crimp is formed to fix the two components together. It can therefore be appreciated that axial movement of the base platform 42 relative to the base rod 41 can create axial movement between shaft 100 and plunger 200. This movement can vary the overall distance of the seal 110 from a set reference point on the plunger of the sub-assembly 10. The measuring arm 43 may be moved towards the base platform 42 until the measuring arm 43 reaches the seal 110 of the shaft 100. The measuring arm 43 can then measure a longitudinal dimension of the sub-assembly 10, for example, between the end of the plunger resting on the base platform and the seal 110. This distance can then be set to a chosen or predetermined position relative to the base platform 42. The base rod 41 may be moved towards and/or away from the measuring arm 43, simultaneously moving the shaft 100 relative to the plunger 200, until the seal 110 of the shaft 100 reaches the chosen measured position measured by measuring arm 43. Once the relative positions of the shaft 100 and the plunger 200 have been set by the dimension-setting apparatus, and whilst still held in place by the dimension-setting apparatus, the shaft 100 may be crimped by the crimping tool 30 to hold it in a fixed axial position relative to the plunger 200. Although a radial crimp from opposite sides of the shaft 100 is shown, other types of crimp may be envisaged. A radial crimp from one side may be sued. Alternatively, a crimp may be formed to coincide with an outwardly extending groove in the bore of the plunger, so that although the longitudinal length of the sub-assembly 10 is fixed, a degree of rotation between the plunger 200 and shaft 100 can be realised if desired. The crimp therefore may not necessarily prevent all movement between the plunger and the shaft 100.

Although a specific form and arrangement of valve sub-assembly is shown in the figures, it will be appreciated that aesthetic changes could be made to the device shown whilst still performing the function of the present invention as defined in the appended claims.

In particular, further to the solenoid actuator 3 and the SMA actuator described in the first and the second embodiments respectively, any workable valve actuator may be used. For example, the actuator 3 may be a manual actuator, a hydraulic actuator, a piezoelectric actuator, a pneumatic actuator, or an electric actuator. Other variations on the embodiments shown and described can be envisaged without departing from the scope of protection as defined in the appended claims

The invention claimed is:

1. A valve, comprising:
a first fluid port;
a second fluid port;
an orifice providing a fluid connection between the first and second fluid ports;
a moveable sub-assembly, moveable between a first position in which the fluid connection is open and a second position in which the fluid connection is closed by the moveable sub-assembly;
the moveable sub-assembly comprising first and second sub-components, the first and second sub-components being mechanically connected by a crimp to fix a position of the first sub-component relative to the second sub-component,
wherein the second sub-component comprises one or more openings configured to enable access to a crimping region to form the crimp.

2. The valve according to claim 1, further comprising a valve seat disposed about the orifice; the valve seat being configured to engage the moveable sub-assembly in the second position, the moveable sub-assembly preferably further comprising a sealing portion configured to seal the valve seat to close the fluid connection between the first and second ports.

3. The valve according to claim 1, wherein the first sub-component is a shaft received at least partially within the second sub-component.

4. The valve according to claim 1, wherein the second sub-component comprises two openings, the two openings being arranged on substantially opposite sides of the second sub-component.

5. The valve according to claim 1, wherein the second sub-component is configured to receive an actuating force of an actuator of a valve.

6. The valve according to claim 1, wherein the second sub-component is connected to an actuator of the valve.

7. The valve according to claim 1, wherein the first sub-component is at least partially received inside the second sub-component, and wherein the crimp is a mechanical deformation directly formed on the first sub-component.

8. A method of forming a moveable valve sub-assembly for a fluid control valve comprising the steps of:
providing first and second sub-components for a moveable subassembly of a fluid control valve;
adjusting a position of the first and second sub-components relative to one another; and
forming a crimp on one of the first and second sub-component to fix their relative positions in at least a first direction, wherein the second sub-component comprises one or more openings;
inserting at least one crimping tool into the one or more openings.

9. The method according to claim 8, further comprising the step of
measuring the relative positions of the first and second sub-components in at least a first direction prior to forming the crimp.

10. The method according to claim 8, further comprising the step of:
inserting the first sub-component at least partially into the second sub-component; and
forming the crimp on the first sub-component within the second sub-component.

11. The method according to claim 8, wherein the crimp is formed directly on the first sub-component by a crimping tool.

12. The method according to claim 8, wherein the second sub-component comprises at least two openings, the two openings being arranged on substantially opposite sides of the second sub-component.

13. The method according to claim 8, wherein the first sub-component is a shaft of a valve.

* * * * *